(12) United States Patent
So

(10) Patent No.: US 6,603,902 B1
(45) Date of Patent: Aug. 5, 2003

(54) WAVELENGTH SELECTIVE VARIABLE REFLECTOR

(75) Inventor: Vincent So, Ottawa (CA)

(73) Assignee: BTI Photonics Inc., Ottawa (CA)

( * ) Notice: Subject to any disclaimer, the term of this patent is extended or adjusted under 35 U.S.C. 154(b) by 36 days.

(21) Appl. No.: 09/666,412

(22) Filed: Sep. 20, 2000

Related U.S. Application Data

(60) Provisional application No. 60/161,370, filed on Oct. 26, 1999.

(51) Int. Cl.[7] .............................. G02B 6/34; G02B 6/02; G02B 6/20; G02B 6/00
(52) U.S. Cl. ........................ 385/37; 385/125; 385/140; 359/573
(58) Field of Search .................... 385/4, 8, 10, 129, 385/132, 43, 42, 37, 39, 40, 124–126, 140; 359/566, 569, 572–574; 372/20

(56) References Cited

U.S. PATENT DOCUMENTS

| | | | |
|---|---|---|---|
| 4,006,963 A | 2/1977 | Baues et al. ............... 350/96 |
| 4,400,056 A | 8/1983 | Cielo ...................... 350/96.19 |
| 4,721,352 A | * 1/1988 | Sorin et al. ................. 385/11 |
| 4,807,950 A | 2/1989 | Glenn et al. ............ 350/3.61 |
| 4,986,624 A | 1/1991 | Serin et al. ............. 350/96.19 |
| 5,007,705 A | 4/1991 | Morey et al. ........... 350/96.29 |
| 5,016,967 A | 5/1991 | Meltz et al. ........... 350/96.19 |
| 5,060,307 A | * 10/1991 | El-Sherif .................. 359/173 |
| 5,410,622 A | 4/1995 | Okada et al. ............... 385/14 |
| 5,412,743 A | 5/1995 | Brazas, Jr. .................... 385/2 |
| 5,446,809 A | 8/1995 | Fritz et al. ................... 385/17 |
| 5,574,807 A | 11/1996 | Snitzer ....................... 385/24 |
| 5,699,468 A | 12/1997 | Farries et al. .............. 385/140 |
| 5,781,670 A | * 7/1998 | Deacon et al. ............... 385/10 |
| 5,805,751 A | 9/1998 | Kewitsch et al. ........... 385/43 |
| 5,809,188 A | 9/1998 | Tseng et al. .................. 385/37 |
| 5,875,272 A | 2/1999 | Kewitsch et al. ............ 385/37 |
| 5,883,990 A | 3/1999 | Sasaoka et al. .............. 385/37 |
| 5,926,300 A | 7/1999 | Miyakawa et al. ......... 359/124 |
| 5,946,430 A | 8/1999 | Morrow et al. ............... 385/24 |
| 5,982,963 A | * 11/1999 | Feng et al. ................... 387/37 |
| 6,167,169 A | * 12/2000 | Brinkman et al. ............. 385/4 |
| 6,324,204 B1 | * 11/2001 | Deacon ........................ 372/96 |
| 6,510,256 B1 | * 1/2003 | Asseh et al. ................... 385/10 |
| 2001/0021294 A1 | * 9/2001 | Cai et al. ....................... 385/37 |

FOREIGN PATENT DOCUMENTS

| | | | |
|---|---|---|---|
| WO | 9826640 | 12/1998 | ........... G02B/6/34 |
| WO | 9902659 | 2/1999 | ........... G02F/1/295 |
| WO | 9905570 | 3/1999 | ........... G02B/6/34 |

OTHER PUBLICATIONS

I. S. Mauchline et al., "Low voltage tunable in–line channel dropping filter using liquid crystal waveguide overlays", Electronics Letters, IEE Stevenage, GB, vol. 33, No. 11, May 22, 1997, pp. 985–986.

* cited by examiner

Primary Examiner—Georgia Epps
Assistant Examiner—William Choi

(57) ABSTRACT

An arrangement is provided having an optical waveguide, a Chirp grating and an electro-optic material arranged adjacent the Chirp grating, the electro-optic material, for example liquid crystal material, having a refractive index which can be varied by applying an electric field to the material so as to control how the Chirp grating interacts with the optical waveguide. The Chirp grating has a spatial period that increases gradually along a length of the grating. The arrangement may function as a wavelength selective variable reflector, or as a wavelength selective variable attenuator. The optical waveguide may have a region of cladding made of the electro-optic material, with the Chirp grating arranged adjacent the region of cladding to cause a reflection of particular wavelengths of light when propagating within the optical waveguide, the arrangement being adapted to receive the applied electric field which controls how the Chirp grating interacts with the waveguide.

18 Claims, 6 Drawing Sheets

WAVELENGTH SELECTIVE VARIABLE REFLECTOR

RELATIONSHIP TO PRIOR APPLICATION

This application claims the benefit of U.S. Provisional Application No. 60/161,370, filed Oct. 26, 1999.

FIELD OF THE INVENTION

The present invention relates to the communication of signals via optical fibers, and particularly to an optical fiber carrying a number of channels multiplexed at different wavelengths. More particularly, the invention relates to gratings and their interaction with an optical waveguide such as an optical fiber.

BACKGROUND OF THE INVENTION

Optical fibers are being used with increasing regularity for the transmission and processing of optical signals. Dense wavelength division multiplexing (DWDM) enables an individual optical fiber to transmit multiple channels simultaneously, the channels being distinguished by their center wavelengths. A need exists for a wavelength sensitive reflector that can be used as a component of an optical fiber system. Such devices are disclosed in U.S. Pat. No. 4,400,056 ("Evanescent-Wave Fiber Reflector", Aug. 23, 1983, Cielo) and U.S. Pat. No. 4,986,624 ("Optical Fiber Evanescent Grating Reflector", Jan. 22, 1991, Serin, et al). As disclosed in U.S. Pat. No. 4,400,056 ("Evanescent-Wave Fiber Reflector", Aug. 23, 1983, Cielo) a grating is developed on a photoresist deposited on the etched cladding of an optical fiber, whereas disclosed in the patent U.S. Pat. No. 4,986,624, ("Optical Fiber Evanescent Grating Reflector", Jan. 22, 1991, Serin, et al) a periodic grating structure is placed on a facing surface formed on an optical fiber. In both patents the grating structure is within a portion on the evanescent field of an optical signal propagating through the optical fiber. In both patents the spatial periodicity of the grating structure is selected to be equal to one-half the propagation wavelength of the optical signal. The grating structure causes the optical signal to be reflected at an angle 180 degrees and thus to propagate in a reverse direction from its original direction of propagation.

Other constructions of optical reflectors known as Bragg filters are gaining popularity. One type of Bragg filter is incorporated or embedded in the core of an optical fiber by a method disclosed, for instance in U.S. Pat. No. 4,807,950 ("Method for Impressing Gratings Within Fiber Optics", Feb. 28, 1989, Glenn, et al). As is discussed in this patent permanent periodic gratings of this kind can be provided or impressed in the core of an optical fiber by exposing the core through the cladding to an interference pattern of two coherent beams of ultraviolet light that are directed against the optical fiber symmetrically to a plane normal to the fiber axis. This results in a situation where the material of the fiber core has permanent periodic variations in its refractive index impressed therein by the action of the interfering ultraviolet light beams. The periodic variations in refractive index oriented normal to the fiber axis, constitute the Bragg grating. An embedded Bragg grating of this kind reflects the light launched into the fiber core for guided propagation. Only that light having a wavelength within a very narrow range dependent on the grating element periodicity is reflected back along the fiber axis opposite to the original propagation direction. To light at wavelengths outside the aforementioned narrow band the grating will be substantially transparent, and will not adversely affect the further propagation of such light. In effect, this type of grating creates a narrow notch in the transmission spectrum, and by the same token a similarly narrow peak in the reflection spectrum. Further development is disclosed in U.S. Pat. No. 5,007,705 ("Variable Optical Fiber Bragg Filter Arrangement", Apr. 16, 1991, Morey, et al) which relates to different aspects or uses of these discovered principles. In this patent various means are disclosed for intentionally shifting the reflection wavelength response of a Bragg grating. By deliberately varying the period of the grating or altering the index of refraction in a predetermined manner, by external forces or actions on the fiber section containing the grating in a controlled manner, a variable light filtering element is provided. Furthermore, tuning a grating by various means such as the application of heat, compression, or stretching are all known. Disadvantageously, these methods only allow the selection of a single wavelength to be reflected. Such mechanical solutions may be bulky, potentially unreliable, and have a slow response time.

U.S. Pat. No. 5,446,809 ("All Fiber Wavelength Selective Optical Switch", Aug. 29, 1995, Fritz, et al). discloses an optical wavelength selective optical switch, utilizing tunable Bragg fiber gratings. The fiber wavelength selective switch has one or more input optical couplers and utilizes a plurality of in-line Bragg fiber gratings in series along multiple parallel paths. For a given wavelength of light to pass through a particular grating, the grating must be detuned. By providing a plurality of Bragg gratings in series, each designed to reflected a different wavelength, and having means for controlling or shifting the response of each grating individually, signals can selectively be passed through a fiber or can be reflected backwards in a binary on-off fashion. The non-binary response version is disclosed in U.S. Pat. No. 5,699,468 ("Bragg Grating Variable Optical Attenuator", Dec. 16, 1997, Farries, et al).

SUMMARY OF THE INVENTION

The invention according to a first broad aspect provides an arrangement having an optical waveguide, a grating, such as a Chirp grating, and an electro-optic material arranged adjacent the Chirp grating, the electro-optic material, for example liquid crystal material, having a refractive index which can be varied by applying an electric field to the material so as to control how the Chirp grating interacts with the optical waveguide. The Chirp grating has a spatial period that increases gradually along a length of the grating.

In the arrangement, the optical waveguide may have a region of cladding made of the electro-optic material, with the Chirp grating arranged adjacent the region of cladding to cause a reflection of particular wavelengths of light when propagating within the optical waveguide, the arrangement being adapted to receive the applied electric field which controls how the Chirp grating interacts with the waveguide.

In one embodiment, the arrangement is adapted to receive the applied electric field in at least one selectable region of the electro-optic material. The at least one selectable region may consist of an interaction region in which the Chirp grating will interact with optical signals in the optical waveguide, regions of the electro-optic material outside of the interaction region defining a blocked region in which the Chirp grating will not interact with optical signals in the optical waveguide, the selection of the interaction and blocked regions controlling which wavelengths of light are reflected.

Typically, the interaction region and blocked region are defined by applying the electric field to the electro-optic material so as to cause an increased index of refraction in the interaction region as compared to the index of refraction in the blocked region.

Wavelength selectivity may be achieved by selectively applying the electric field to appropriate portions of the electro-optic material thereby causing interaction with an appropriate portion of the spatial Chirp grating.

Preferably, electrodes are provided and arranged to cause reflection of any polarization of the wavelengths to be reflected, for example by applying first and second electric fields which are substantially perpendicular to each other.

For example, the arrangement might be adapted to apply the first electric field with a first plurality of electrodes of first polarity on a first side of the electro-optic material and a second plurality of electrodes of second polarity on a second side of the electro-optic material, and to apply the second electric field with a third plurality of electrodes of first polarity on a first side of the electro-optic material and a fourth plurality of electrodes of second polarity on a second side of the electro-optic material.

In any of the above embodiments, the waveguide might for example be a optical fiber with a portion of cladding removed from where the electro-optic material is located.

In one embodiment, the arrangement has a bottom substrate on which the Chirp grating is located, and a top substrate adapted to hold the optical fiber parallel to the Chirp grating. The electro-optic material is then sandwiched between the bottom substrate and the top substrate.

Any of the above arrangements might further include a housing assembly, an input connector and an output connector, and may be provided in combination with a voltage source and a controller adapted to control to which of the electrodes a voltage is applied to so as to apply the electric field.

Preferably, the Chirp grating has a spatial periodicity which increases along its length from $\Lambda_A$ to $\Lambda_B$, where $\Lambda_A=\lambda_A (2 n_{eff})$ and $\Lambda_B=\lambda_B/(2 n_{eff})$, and $\lambda_A$ to $\lambda_B$ is an operational wavelength range of the arrangement. To reflect a wavelength $\lambda_C$, $\lambda_A \leq \lambda_C \leq \lambda_B$, an electric field is applied to a region of the Chirp grating having $\Lambda_C=\lambda_C/(2 n_{eff})$.

In another embodiment, a DWDM optical communication system which includes one or more of the above defined arrangements is provided.

The invention in accordance with another broad aspect provides an arrangement such as described previously further adapted to function as a wavelength selectable variable optical attenuator.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

An embodiment of the present invention provides a device for providing 180 degree reflection of selective wavelengths of an optical signal travelling along a optical waveguide, preferably an optical fiber. Furthermore in some embodiments the amount of reflection can be controlled individually for multiple wavelengths.

Figure 1A:
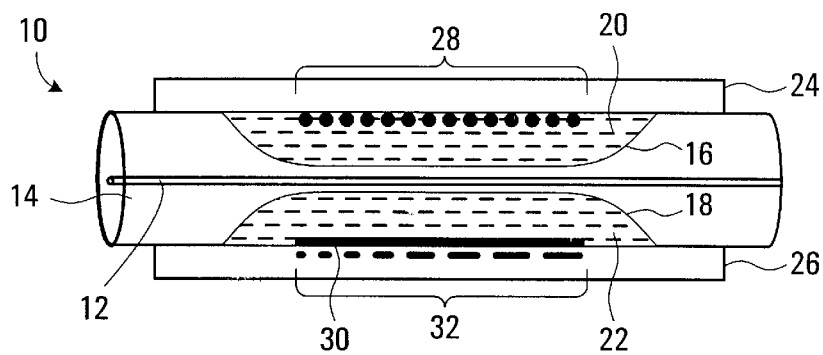
FIG. 1A is a side cut-away view of a wavelength selective variable reflector provided by an embodiment of the invention.

Referring now to FIG. 1A, this embodiment includes a portion of optical fiber generally indicated by 10, having a core 12 and a cladding 14. A portion of the fiber 10 is etched to remove part of its cladding 14 to define recessed areas 16,18 on opposite sides of the core 12. The portion of the fiber 10 with the recesses 16,18 is immersed in liquid crystal (or some other media which has a suitable electro-optic effect, for example certain polymers or quartz) and sandwiched between two substrates 24,26 including an upper substrate 24 and a lower substrate 26 thereby providing regions of liquid crystal 20,22 which effectively become part of the cladding of the filter 10. The inner surface of the upper substrate 24 is deposited with a line of positive electrodes 28. The inner surface of the lower substrate 26 is etched with a grating 32 such as a Chirp grating and covered with a thin negative electrode 30. Alternatively, more control over an electric field applied to the liquid crystal material may be achieved by having multiple negative electrodes, for example one for each positive electrode. The Chirp grating 32 has a spatial period that increases gradually along its length. The spatial periodicity increases from $\Lambda_A$ to $\Lambda_B$ where $\Lambda_A=\lambda_A/(2 n_{eff})$, $\Lambda_B=\lambda_B/(2 n_{eff})$, $\lambda_A$ to $\lambda_B$ is the operational wavelength range of the device, and $n_{eff}$ is the effective index of the optical fiber 10 for the guided mode at the wavelength of the light which is reflected. $\Lambda_1$ and $\Lambda_2$ are design parameters which can be selected for a particular application. One particular set of example values for $\lambda_A$ and $\lambda_B$ is $\lambda_A$=1525 nm and $\lambda_B$=1610 nm.

An electric field can be created in any region in the liquid crystal 20,22 along the Chirp grating 32 by applying a voltage to a subset of the positive electrodes 28 in the upper substrate 24 above the region of interest in the liquid crystal 20,22 and the negative electrode 30 in the lower substrate 26. The positive electrodes 28 are preferably individually selectable. More generally, they need to be selectable to whatever resolution is required to select the wavelength or wavelengths of interest.

The liquid crystal 20,22 is chosen to have the property that when there is no electric field, the refractive index of the liquid crystal is less than or equal to the cladding's 14, and when an electric field is applied, the liquid crystal 20,22 re-orients itself and its refractive index increases higher than the cladding's 14.

Figure 1B:
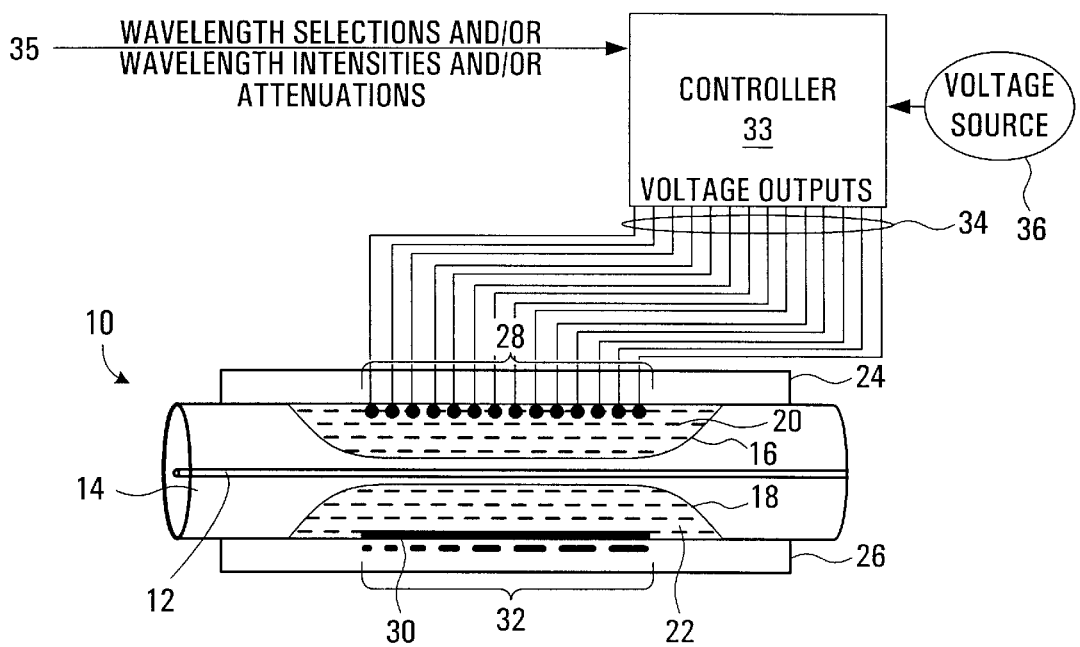
FIG. 1B is a view of the wavelength selective variable reflector of FIG. 1A with an example control system.

Any suitable system, method or device may be used to control the voltages to be applied to the positive and negative electrodes such that the desired electric field(s) are established. A very simple example of control system is shown in FIG. 1B in which a controller 33 is shown having a individually controllable voltage outputs (collectively 34) to each of the positive electrodes 28 and possibly also to the negative electrode(s) 30. The controller 33 is connected to a power source such as a voltage source 36. The controller 33 has an input 35 consisting of wavelength selections (for reflection, transparency, or attenuation) and/or attenuation values, and/or wavelength strengths upon which to compute attenuation values. Input 35 may be remotely generated, or may be locally selectable. The controller 33 uses the input 35 to determine what voltage to apply, if any, to each of the electrodes, and performs any necessary conversion from the voltage provided by the voltage source 36 to the voltage to be applied to each electrode. The controller 33 may be implemented through any suitable means, for example a processor with software, ASIC, FPGA, discrete devices, or any combination of such means.

Figure 2A:
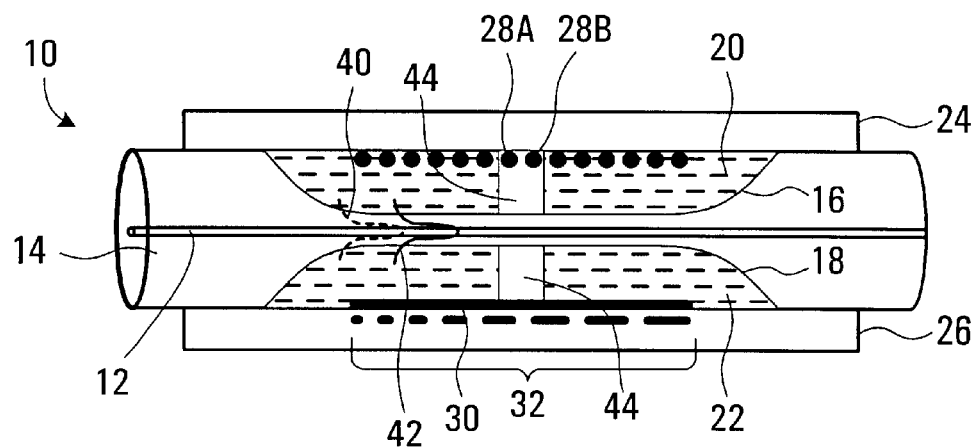
FIGS. 2A–2D show the wavelength selective variable reflector of FIG. 1A in the presence of an applied electric field.
Figure 2B:
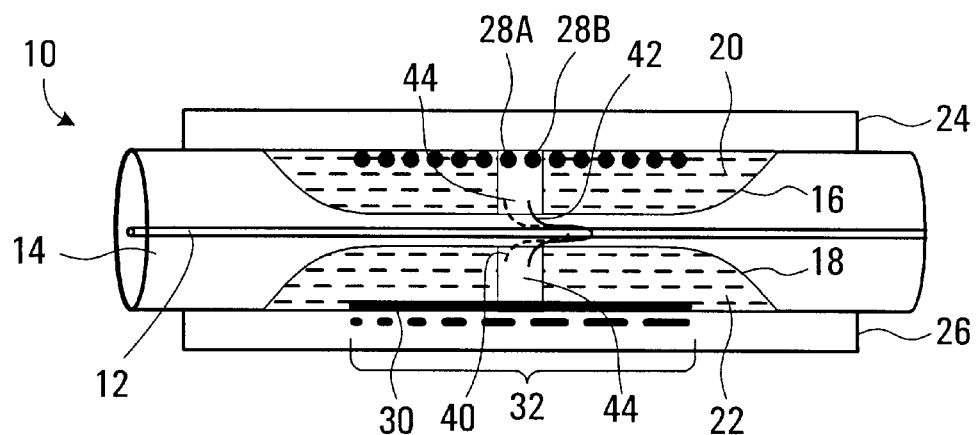
Figure 2C:
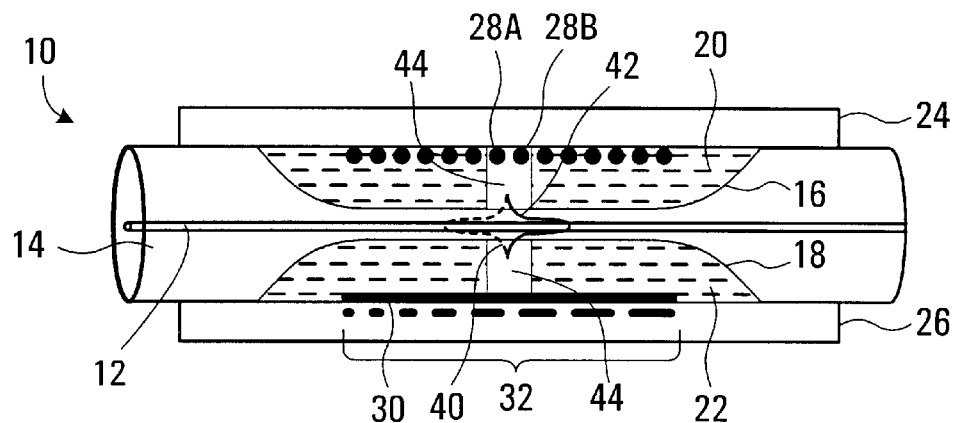
Figure 2D:
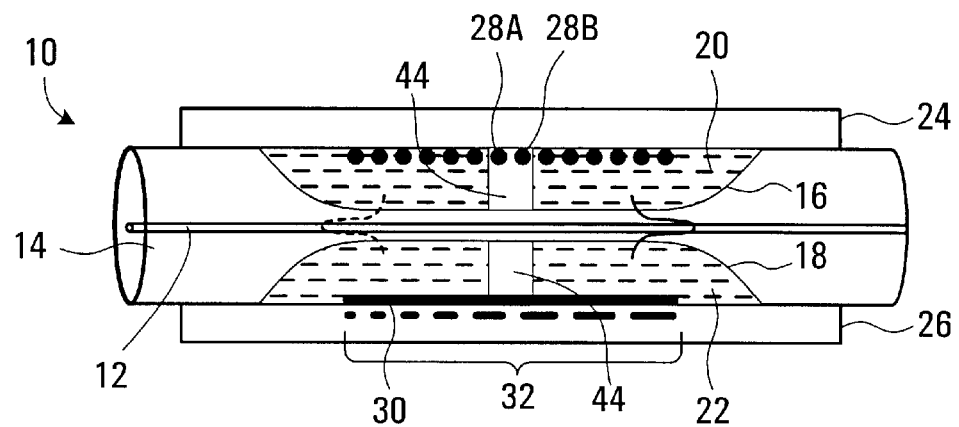

As shown in FIG. 2A, a plurality of wavelengths can propagate along the fiber, for example light 40 with wavelength $\lambda_1$ and light 42 with wavelength $\lambda_2$ both assumed to be between the operational range of the device identified above to be $\lambda_A$ to $\lambda_B$. In order to set up the device to reflect the light with wavelength $\lambda_1$, a voltage is applied where the periodicity of the grating 32 corresponds to $\Lambda_1 = \lambda_1/(2\ n_{eff})$ where $n_{eff}$ is the effective index of the optical fiber 10 at $\lambda_1$. In the example, it is assumed that region 44 is the region where the grating 32 has the required periodicity. Thus a voltage is applied between the positive electrodes 28A, 28B in this region 44, and the negative electrode 30. When light propagates along the fiber 10, the light is mainly confined to the core 12 with a short evanescent field in the cladding 14. The penetration depth of the evanescent field varies inversely with the difference between the refractive index of the core 12 and the cladding 14. Where the refractive index of the liquid crystal 20,22 is raised by the applied electric field, the evanescent field becomes deeper and interacts with the grating structure 32. The light 40 with wavelength at $\lambda_1$ which satisfies the relation $\lambda_1 = 2\ n_{eff}\ \Lambda_1$ gets reflected backward (FIG. 2C), and the light 42 with wavelength at $\lambda_2$ keeps on propagating forward (FIG. 2D).

The wavelength/wavelengths to be reflected can be controlled by applying voltage to the appropriate electrode/electrodes at the location of the grating that have the periodicity required for the particular wavelength.

Figure 3:
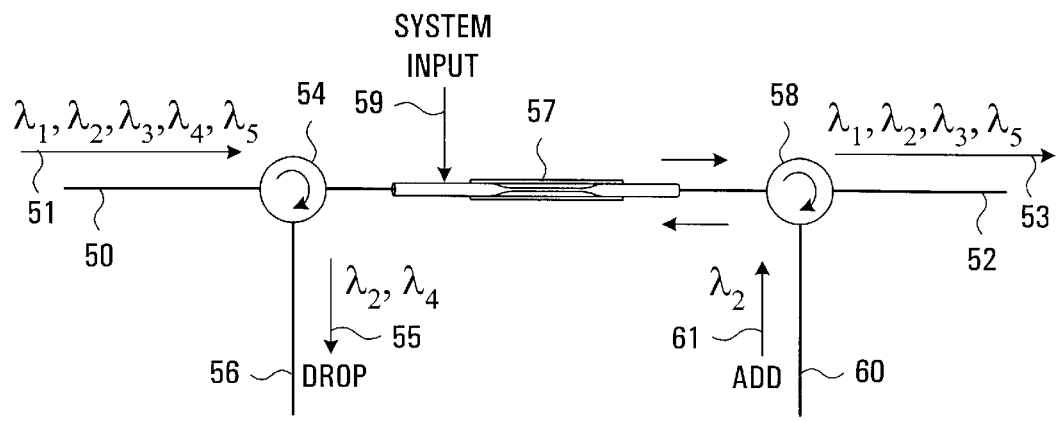
FIG. 3 shows an add/drop multiplexor according to an embodiment of the invention featuring the wavelength selective variable reflector of FIG. 1A.

Referring now to FIG. 3, an embodiment of the invention provides a wavelength selective add/drop multiplexer featuring the above described wavelength selective variable reflector. This add/drop multiplexer can be used to dynamically reconfigure fiber-optical communication networks by adding channels or dropping channels. The add/drop multiplexer has an input fiber 50, and an output fiber 52. There is a drop circulator 54 connected to receive an input from the input fiber 50 and connected to produce an output at a drop fiber 56. The drop circulator 54 is also connected bidirectionally to a wavelength selective variable reflector 57 which in turn is connected bidirectionally to an add circulator 58. The add circulator 58 is connected to produce an output to the output fiber 52. The add circulator 58 is also connected to receive an input from an add fiber 60. A system input 59 is also shown which controls the wavelength selective variable reflector 57, and more particularly controls which wavelengths are to be reflected.

Circulator 54 passes optical signals received from input fiber 50 on to the wavelength selective variable reflector 57. Some of the wavelengths of the optical signals are passed by the wavelength selective variable reflector 57. Others are reflected back to the circulator 54. The particular wavelengths which are passed are selected by the application of an electric field between the appropriate positive electrodes, and the negative electrodes of the wavelength selective variable reflector 57. The circulator passes these reflected back signals to the drop fiber 56. Similarly, those wavelengths which are passed by the wavelength selective variable reflector 57 pass through the add circulator 58 to the output fiber 52. An optical signal input on add fiber 60 passes through add circulator 58 which outputs them towards the wavelength selective variable reflector 57. Assuming the wavelength selective variable reflector 57 has been configured to reflect the wavelengths added on add fiber 60, the wavelength selective variable reflector reflects these signals back towards the add circulator 58 and they are output on the output fiber 52.

In the illustrated example, it is assumed that each fiber 50,52,56,60 is adapted to carry five different wavelengths $\lambda_1, \lambda_2, \lambda_3, \lambda_4$ and $\lambda_5$. The wavelength selective variable reflector 57 is designed to allow the individual selection of which wavelengths to pass and which to reflect. Assuming $\lambda_1$ is the smallest frequency and $\lambda_5$ the largest, the spatial grating should be designed to have $\Lambda_A \leq \lambda_1/(2\ n_{eff})$ and $\Lambda_B \geq \lambda_2/(2\ n_{eff})$. The signal 51 input on fiber 50 is shown to contain all these five wavelengths $\lambda_1, \lambda_2, \lambda_3, \lambda_4$ and $\lambda_5$. For this example, the add/drop multiplexer is to be configured to drop wavelengths $\lambda_2$ and $\lambda_4$. Thus, the electric field applied to the wavelength selective variable reflector 57 must be selected to cause reflection of these two wavelengths, resulting in an optical signal 55 having wavelengths $\lambda_2$ and $\lambda_4$ being output on drop fiber 56. The remaining wavelengths $\lambda_1, \lambda_3, \lambda_5$ pass through the wavelength selective variable reflector 57 to the add circulator 58. The signal 61 to be added on add fiber 60 is assumed to have wavelength $\lambda_2$. Generally speaking, the wavelengths added from add fiber 60 should have different wavelengths from those passed through the wavelength selective variable reflector 57 from the add circulator 54. This means the wavelengths need to be either different from those input in input fiber 50, or where they are the same, that the overlapping wavelengths from input fiber 50 are dropped at drop fiber 54. In any case, the wavelength selective variable reflector needs to be configured to reflect the wavelengths being dropped on drop fiber 56, and to reflect the frequencies being added on add fiber 60 if different. The signal 61 added from add fiber 60 has wavelength $\lambda_2$ and is thus reflected towards add circulator 58 which outputs a signal 53 having both the added wavelength $\lambda_2$ and the wavelengths $\lambda_1, \lambda_2, \lambda_5$ passed from the drop circulator 54.

In another embodiment of the invention, the above described wavelength selective variable reflector can be used as a wavelength selectable variable optical attenuator to dynamically adjust the power level of individual wavelengths in a composite wavelength optical signal. This is very useful in optical communication systems to control the power level of all the optical channels after being amplified by an optical fiber amplifier for example to improve overall system performance. The wavelength selectable variable optical attenuator may be used to make the intensity of each of a group of wavelengths equal, or alternatively, may be used to make the intensity of each of a group of wavelengths different in a manner which compensates for example for unequal losses at these wavelengths elsewhere within the optical channel.

Figure 4:
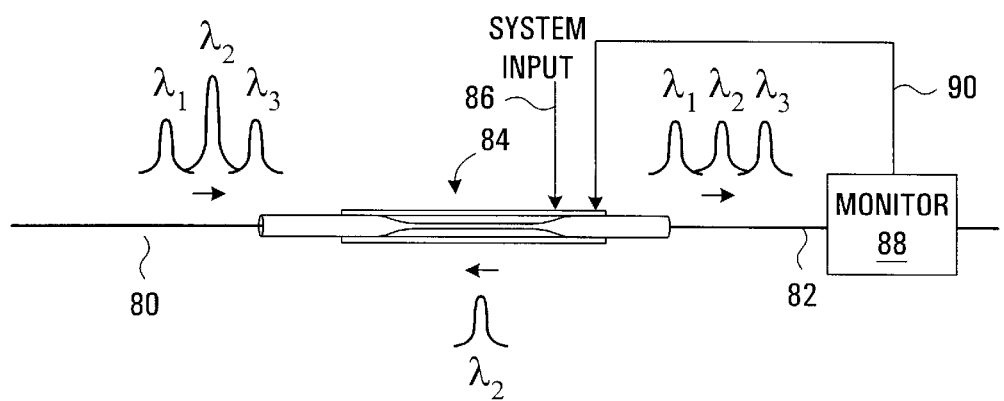
FIG. 4 shows the wavelength selective variable reflector of FIG. 1A in use as a wavelength selectable variable optical attenuator.

An example of a wavelength selectable variable optical attenuator provided by an embodiment of the invention is shown in FIG. 4. In this example, an input fiber 80 is connected to one side of a wavelength selective variable reflector 84 such as described previously. An output fiber 82 is connected to the other side of the wavelength selective variable reflector 84.

The wavelength selective variable reflector 84 has a range of operations including all wavelengths of interest which may be received on input fiber 80.

In the illustrated example, light at wavelengths $\lambda_1$, $\lambda_2$ and $\lambda_3$ is propagating along the input fiber 80, and the light at wavelength $\lambda_2$ is stronger than the light at the remaining wavelengths 71,73. Voltage is applied to the wavelength selective variable reflector 84 to make it partially reflective to wavelengths at 72, thereby causing it to reflect part of the light at wavelengths at $\lambda_2$. The result is that the relative intensity of the light at wavelength 72 decreases, and an equalization of the power at all the wavelengths results.

To control the wavelength selective variable reflector 84 and more particularly to control the amount of voltage applied and to which particular electrodes, a system input 86 may be used, and/or a monitor 88 may be provided downstream (closed loop control) or upstream (open loop control, not shown) from the device which measures light intensity at different wavelengths and produces control signals 90.

Figure 5A:
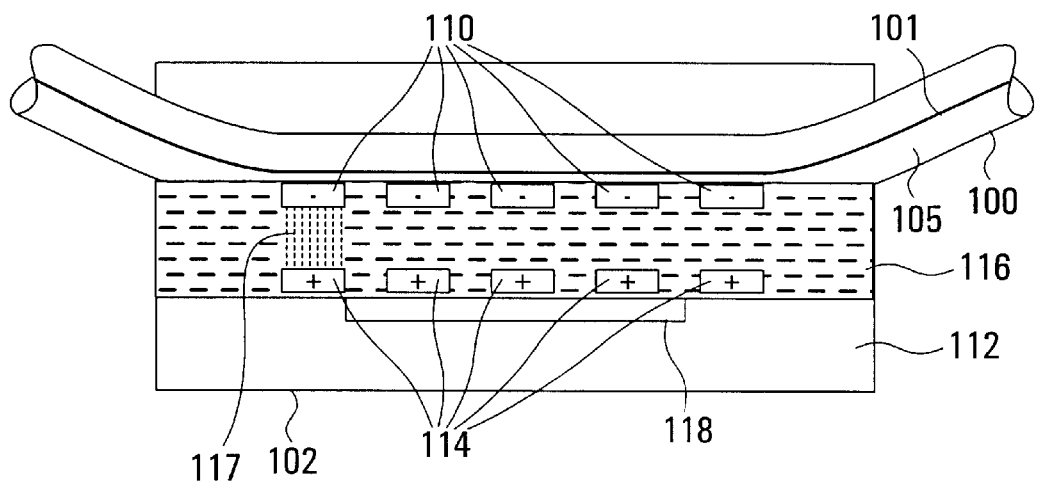
FIGS. 5A, 5B shows a wavelength selective variable reflector provided by another embodiment of the invention.
Figure 5B:
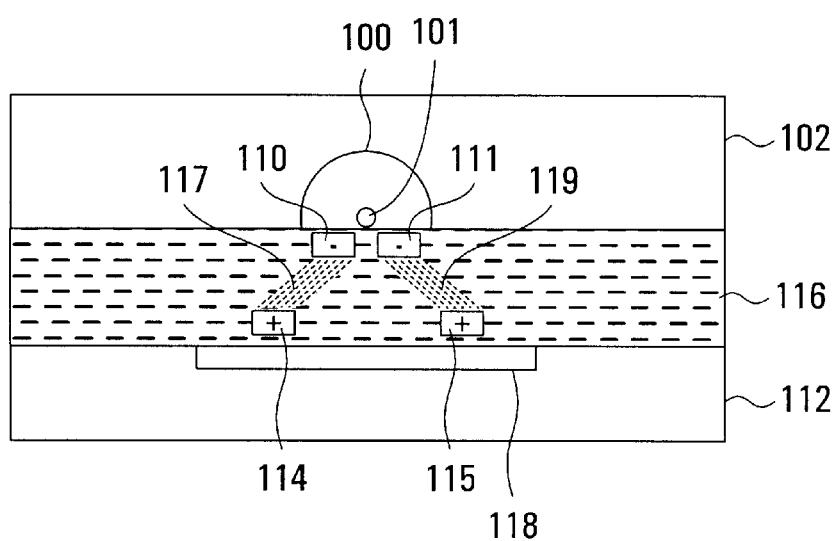
Figure 6:
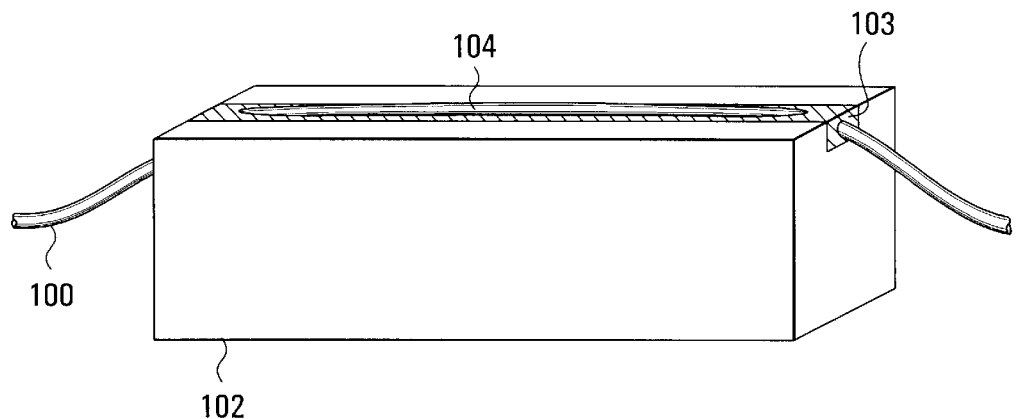
FIGS. 6 and 7 show the wavelength selective variable reflector of FIG. 5 in various stages of construction.
Figure 7:
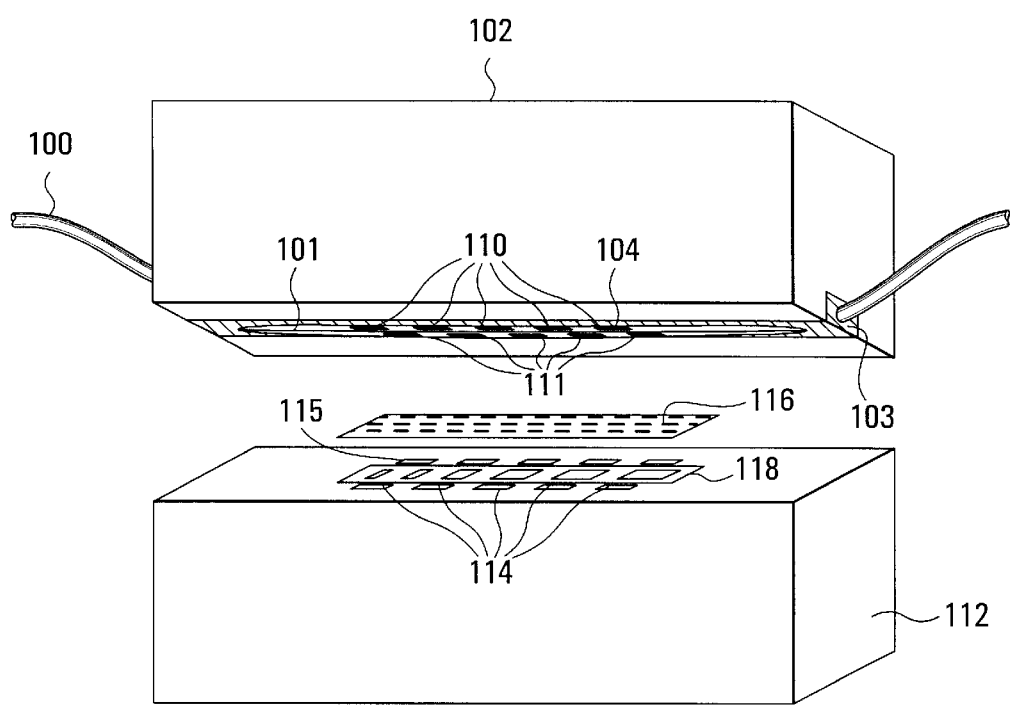

Referring now to FIGS. 5 through 7 another embodiment of the invention will be described, this being an alternative implementation of the wavelength selective variable reflector.

FIG. 5A is a sectional view taken lengthwise through the wavelength selective variable reflector, and FIG. 5B is a sectional view taken across the wavelength selective variable reflector. This embodiment has a top substrate 102 and a bottom substrate 112 made of fused silica for example. Between the top substrate 102 and the bottom substrate 112 is a thin layer 116 of liquid crystal material (or other material having the electro-optic effect). In the top substrate 102 there is a recessed cut 103 (see FIG. 6) for holding a fiber 100. The fiber 100 has a core 101 and cladding 105. In a region 104, part of the cladding 105 has been removed for example by polishing along the length of the fiber in cut 103 bringing the core 101 closer to the fiber's surface. The fiber 100 thus installed in the top substrate 102 along with the polished surface 104 of the fiber 100 form a smooth surface. The bottom substrate 112 has a grating 114 etched in its surface, the grating having a spatial periodicity which increases along its length as in previous embodiments.

On the surface of the top substrate 102/fiber 100 combination facing the liquid crystal layer 116, there are two parallel lines of negative electrodes 110,111 only one of which 110 is shown in the longitudinal view of FIG. 5A. The electrodes 110,111 are shown positioned fairly close to the core 101 of the fiber 100. Preferably, the electrodes are deposited on the surface of the polished portion 104 of fiber 100 as this allows the voltages of smaller magnitudes to be used with the same effect. Similarly, on the surface of the bottom substrate 112, there are two parallel lines of positive electrodes 114,115, only one of which 114 is shown in the longitudinal view of FIG. 5A. As shown in the end view of FIG. 5B, the lines of electrodes 114,115 are preferably positioned in radial directions along perpendicular imaginary lines defined by the core 101 and the negative electrodes 110,112.

Each of the electrodes in the negative lines of electrodes 110,111 and the positive electrodes 114,115 is preferably individually addressable in the sense that a positive voltage can be applied to any positive electrode or group of positive electrodes, and a negative voltage can be applied to any negative electrode or group of negative electrodes. The circuit traces for applying these voltages are not shown. Alternatively, the electrodes can be set up in groups of four electrodes in a single cross-sectional plane such that two electric fields are set up which are preferably perpendicular to each other, one between an electrode in line 110 and an electrode in line 114, and another between an electrode in line 111 and an electrode in line 115. An example of this is shown in FIGS. 5A and 5B where two fields 117,119 have been established, only field 117 being shown in the view of FIG. 5A.

The function of this device is similar to that of the previous embodiment. By appropriately controlling where a voltage is applied to the liquid crystal, the desired portion of the spatial grating 114 is allowed to interact with the fiber. In this embodiment, by having the field applied in two perpendicular axes, the device should not introduce any polarization effects. Any residual polarization effects may be compensated for by applying different voltages to the electrodes.

The steps taken in an example method of manufacture of the device of FIGS. 7A and 7B will now be described with reference to FIGS. 6 and 7. First, as shown in FIG. 6, the fiber 100 is placed in the recessed cut 103 of the upper substrate 102, and portion 104 of the fiber's cladding is polished away leaving a flush surface. As shown in FIG. 7, the negative electrodes 110,111 are then applied to the top substrate or polished region 104 of the fiber 100. The spatial grating 118 is applied to the bottom substrate 112, and the positive electrodes 114 115 formed thereon. Next, some liquid crystal material 116 is applied, for example by applying a drop to the bottom substrate 112 and the two substrates are brought together to form the arrangement of FIG. 5.

The variable reflector and wavelength selective variable variable optical attenuator described above may be implemented as components which may be inserted between two optical fibers using optical connectors. Details of the insertion of components are not provided or shown as they are well known in the art.

Numerous modifications and variations of the present invention are possible in light of the above teachings. It is therefore to be understood that within the scope of the appended claims, the invention may be practised otherwise than as specifically described herein.

I claim:

1. An arrangement comprising an optical waveguide adapted to receive an optical signal which derives an evanescent field, a grating and an electro-optic material arranged adjacent the grating, the electro-optic material having a refractive index which can be varied by applying an electric field to the material so as to control how the grating interacts with the evanescent field of the optical signal, the grating having a spatial period that increases gradually along a length of the grating;

wherein the waveguide is an optical fiber with a portion of cladding removed where the electro-optic material is located.

2. An arrangement according to claim 1 comprising a bottom substrate on which the grating is located, and a top substrate adapted to hold the optical fiber parallel to the grating.

3. An arrangement according to claim 2 wherein the electro-optic material is sandwiched between the bottom substrate and the top substrate.

4. An arrangement according to claim 3 wherein the electrodes are arranged to apply first and second electric fields which are substantially perpendicular to each other;

wherein to apply the first electric field the electrodes comprise a first plurality of electrodes of first polarity on a first side of the electro-optic material and a second plurality of electrodes of second polarity on a second side of the electro-optic material;

wherein to apply the second electric field the electrodes comprise a third plurality of electrodes of first polarity on a first side of the electro-optic material and a fourth plurality of electrodes of second polarity on a second side of the electro-optic material.

5. An arrangement according to claim 4 wherein the first and third pluralities of electrodes are on the bottom substrate and the second and fourth pluralities of electrodes are on the top substrate.

6. An arrangement according to claim 4 wherein the first and third pluralities of electrodes are on the bottom substrate and the second and fourth pluralities of electrodes are on the fiber.

7. An arrangement comprising an optical waveguide adapted to receive an optical signal which derives an evanescent field, a grating, an electro-optic material arranged adjacent the grating, a housing assembly, an input connector and an output connector, the electro-optic material having a refractive index which can be varied by applying an electric field to the material so as to control how the grating interacts with the evanescent field of the optical signal, the grating having a spatial period that increases gradually along a length of the grating.

8. An arrangement according to claim 1 wherein the electro-optic material comprises liquid crystal.

9. An arrangement according to claim 1 wherein the electro-optic material comprises a polymer.

10. An arrangement comprising an optical waveguide adapted to receive an optical signal which derives an evanescent field, a grating and an electro-optic material arranged adjacent the grating, the electro-optic material having a refractive index which can be varied by applying an electric field to the material so as to control how the grating interacts with the evanescent field of the optical signal, the grating having a spatial period that increases gradually along a length of the grating;

wherein the electro-optic material comprises quartz.

11. A DWDM optical communication system comprising the arrangement of claim 1.

12. An optical fiber, having a core and a cladding with a portion of the fiber etched to remove part of its cladding, the etched portion having been replaced with liquid crystal material and sandwiched between two substrates including an upper substrate and a lower substrate, an inner surface of the upper substrate being deposited with lines of electrodes for applying an electric field to a selectable region of the liquid crystal material, an inner surface of the lower substrate being etched with a Chirp grating and covered with a thin electrode, the Chirp grating having a spatial period that increases gradually along its length, the liquid crystal material having a property that when there is no electric field, the refractive index of the liquid crystal is less than or equal to the cladding's, and when electric field is applied, the liquid crystal re-orients itself and its refractive index increases higher than the cladding's.

13. An arrangement comprising an optical waveguide adapted to receive an optical signal which derives an evanescent field, a grating and an electro-optic material arranged adjacent the grating, the electro-optic material having a refractive index which can be varied by applying an electric field to the material so as to control how the grating interacts with the evanescent field of the optical signal, the grating having a spatial period that increases gradually along a length of the grating;

wherein the arrangement is adapted to function as a wavelength selectable variable optical attenuator.

14. An arrangement comprising an optical waveguide adapted to receive an optical signal which derives an evanescent field, a Chirp grating and an electro-optic material arranged adjacent the Chirp grating, the electro-optic material having a refractive index which can be varied by applying an electric field to the material so as to control how the Chirp grating interacts with the evanescent field of the optical signal, the Chirp grating having a spatial period that increases gradually along a length of the Chirp grating;

wherein the optical waveguide has a region of cladding made of the electro-optic material, wherein the Chirp grating is arranged adjacent the region of cladding to cause a reflection of particular wavelengths of light when propagating within the optical waveguide, the arrangement being adapted to receive the applied electric field, which controls how the Chirp grating interacts with the evanescent field of the optical signal, in at least one selectable region of the electro-optic material;

wherein the at least one selectable region comprises an interaction region in which the Chirp grating will interact with optical signals in the optical waveguide, regions of the electro-optic material outside of the interaction region defining a blocked region in which the Chirp grating will not interact with optical signals in the optical waveguide, the selection of the interaction and blocked regions controlling which wavelengths of light are reflected, the interaction region and blocked region being defined by applying the electric field to the electro-optic material so as to cause an increased index of refraction in the interaction region as compared to an index of refraction in the blocked region; and wherein the electrodes are arranged to cause reflection of any polarization of the wavelengths to be reflected.

15. An arrangement according to claim 14 wherein the electrodes are arranged to apply first and second electric fields which are substantially perpendicular to each other.

16. An arrangement according to claim 15 wherein to apply the first electric field the electrodes comprise a first plurality of electrodes of first polarity on a first side of the electro-optic material and a second plurality of electrodes of second polarity on a second side of the electro-optic material;

wherein to apply the second electric field the electrodes comprise a third plurality of electrodes of first polarity on the first side of the electro-optic material and a fourth plurality of electrodes of second polarity on the second side of the electro-optic material.

17. An arrangement comprising an optical waveguide adapted to receive an optical signal which derives an evanescent field, a Chirp grating and an electro-optic material arranged adjacent the Chirp grating, the electro-optic material having a refractive index which can be varied by applying an electric field to the material so as to control how the Chirp grating interacts with the evanescent field of the optical signal;

wherein the Chirp grating has a spatial periodicity which increases along a length of the Chirp grating from $\Lambda_A$ to $\Lambda_B$, where $\Lambda_A = \lambda_A/(2\, n_{\mathit{eff}})$, and $\Lambda_B = \lambda_B/(2\, n_{\mathit{eff}})$, and $\lambda_A$ to $\lambda_B$ is an operational wavelength range of the arrangement.

18. An arrangement according to claim 17 wherein to reflect a wavelength $\lambda_C$, $\lambda_A \leq \lambda_C \leq \lambda_B$, an electric field is applied to a region of the Chirp grating having $\Lambda_C = \lambda_C/(2\, n_{\mathit{eff}})$.

* * * * *